US005699360A

United States Patent [19]

Nishida et al.

[11] Patent Number: 5,699,360

[45] Date of Patent: Dec. 16, 1997

[54] METHOD OF AND SYSTEM FOR DISTRIBUTING DIGITAL AUDIO IMAGE DATA

[75] Inventors: Masami Nishida, Chigasaki; Takashi Takeuchi, Fujisawa; Hiroaki Takahashi, Yokohama; Masayuki Inoue, Yokohama; Hitoshi Akiyama, Yokohama; Masakazu Hamaguchi, Ebina, all of Japan

[73] Assignee: Hitachi, Ltd., Tokyo, Japan

[21] Appl. No.: 597,967

[22] Filed: Feb. 7, 1996

[30] Foreign Application Priority Data

Feb. 17, 1995 [JP] Japan .................................... 7-029090

[51] Int. Cl.[6] ........................................................ H04J 3/12

[52] U.S. Cl. .......................... 370/503; 370/521; 370/529; 348/384

[58] Field of Search ................................ 370/110.4, 314, 370/321, 344, 347, 346, 468, 471, 477, 478, 480, 493, 498, 503, 508, 509, 518, 519, 521, 525, 526, 529, 202; 395/155; 348/589, 563, 595, 600, 468, 15, 13, 7, 8, 10, 12, 385, 426, 489, 384, 386, 388, 389; 455/5.1, 72; 382/186; 381/29; 380/23

[56] References Cited

U.S. PATENT DOCUMENTS

| | | | |
|---|---|---|---|
| 4,994,909 | 2/1991 | Graves et al. | 358/86 |
| 5,010,500 | 4/1991 | Makkuni et al. | 364/521 |

*Primary Examiner*—Dang Ton

*Attorney, Agent, or Firm*—Antonelli, Terry, Stout & Kraus, LLP

[57] ABSTRACT

Digitally-compressed audio and image data of a plurality of programs (logical channels) are distributed and superimposed for every horizontal synchronizing signal period together with identification information of each of the programs in place of a luminance signal of an analog video signal of each of physical channels. Each of the physical channels is superimposed in its frequency and distributed from a signal transmission facility of a broadcasting station. At the receiving side, a desired physical analog channel is tuned and the compressed digital audio and image data superimposed on the tuned video signal are selected and taken as desired logical channel data in reference to program identification information, and the compressed digital audio and image data are decoded to obtain their original audio and moving images. With such an arrangement as above, in an existing CATV system, a mere insertion of an encoder unit into a transmission side and a decoder unit into a receiving side, without improving a characteristic of an analog video signal distribution system such as a cable or the like, respectively, enables a greater number of programs to be supplied correspondingly by the amount of digital compression.

11 Claims, 9 Drawing Sheets

METHOD OF AND SYSTEM FOR DISTRIBUTING DIGITAL AUDIO IMAGE DATA

BACKGROUND OF THE INVENTION

1. Field of the Invention

The present invention relates to a digital audio image data distribution system wherein a plurality of digitally-compressed audio image signals are time-division multiplexed and distributed from the storage device side to increase the number of transmission channels on a communication path and a specific audio image signal is selected, expanded and reproduced on the reproducing device side.

2. Description of the Related Art

As one example of conventional audio image distribution systems, there has been known a video selection/distribution system described in Japanese Patent Laid-Open No. Hei 4-505081 (1992), for example.

This type of video selection/distribution system is of a small-scale video selection/distribution system employed within a given range in a hotel, a hospital or the like as shown in FIG. 9. Reference numeral 900 indicates a server control device for performing control on each VTR device and control on the switching between output channels according to user's demands. Reference numerals 901 indicate control data receivers for respectively sending the requests issued by the respective users to the server control device 900. Reference numerals 902 respectively indicate VTR devices for producing analog outputs. Reference numeral 903 indicates a switch circuit for sending an analog video signal produced from one of the VTR devices 902 to a specific channel. Reference numerals 904 respectively indicate analog modulators. Reference numerals 905 respectively indicate RF converters for respectively converting data into their corresponding channels. Reference numeral 906 indicates a frequency multiplexer. Reference numeral 907 indicates a transmission cable. Reference numerals 908 respectively indicate service rooms for providing video distribution services for the individual users. Reference numeral 909 indicates a video signal receiving unit provided in each service room 908. Reference numerals 910, 911 and 912 respectively indicate a tuner, a demodulator and a video signal processing circuit that constitute the video signal receiving unit. Reference numeral 913 indicates a television set for displaying a video signal. Reference numeral 914 indicates a controller for performing switching between channels by each user. Reference numeral 915 indicates a control data transmitter for sending a signal outputted from the controller 914 to its corresponding control data receiver 901.

When the user placed in the service room 908 by-channel selects a program that the user desired to see using the controller 914 in the system shown in FIG. 9, a control signal issued from the controller 914 is sent from the control data transmitter 915 to the control data receiver 901 through the transmission cable 907, followed by input to the server control device 900.

One example of a frequency band employed in the transmission cable at this time is shown in FIG. 10. An up band from each service room under the control of one cable utilizes a range of 10 MHz to 50 MHz and a down band for delivering or distributing a video signal utilizes a range of 70 MHz to 450 MHz.

The server control device 900 activates the VTR device 902 corresponding to the program selected by the user in response to transmitted control data and controls the switch circuit 903 so as to assign a video signal sent from the VTR device 902 to the channel associated with the service room that the user utilizes. A video signal outputted from the switch circuit 903 is sent to its corresponding modulator 904 and thereafter converted into a signal corresponding to a predetermined channel by the corresponding RF converter 905. The converted signal is frequency-multiplexed together with a signal for other program by the frequency multiplexer 906 and the frequency-multiplexed signal is transmitted through the transmission cable 907. The frequency-multiplexed video signal is inputted to the video signal receiving unit 909 in the service room 908 that the user utilizes. In the video signal receiving unit 909, only the video signal associated with the predetermined channel is selected by the tuner 910 and demodulated by the demodulator 911, followed by conversion into a television signal by the video signal processing circuit 912, whereby the program requested by the user is displayed on the television set 913.

Owing to such a construction of system, the system can bring about a feature that the user can freely select and enjoy a video program suited to the user by simply operating a controller such as a remote-controller or the like from the user's service room without getting out of the service room or getting a person to bring a video tape into the service room.

SUMMARY OF THE INVENTION

The aforementioned prior art does not take into consideration the fact that the quality of an image is declined due to the repeated reproduction of a video tape and a limitation to the number of channels results from an available frequency band.

With the foregoing in view, an object of the present invention is to enable an increase in the number of signal distribution channels without causing decline in the quality of an image even if a playback is repeated again and again and without replacing a signal distribution cable employed in the already-existing analog signal distribution system with another.

According to one aspect of the present invention, for achieving the above object, there is provided a digital audio image data distribution system comprising: a single or a plurality of information storage mediums having digitally-compressed audio and image data stored therein; an information read controller for reading the compressed digital audio image data from each information storage medium; means for periodically time-division multiplexing a plurality of read compressed digital audio image data for each video interval of a horizontal scanning period in a video signal and transmitting the time-division multiplexed data therefrom; a PLL circuit for reproducing a data extracting clock synchronized with the compressed digital audio image data extracted from a received signal; a compressed digital audio image data selection circuit for separating and extracting only specific digitally-compressed audio image data from compressed digital audio image data periodically time-division multiplexed using the extracted clock; and a digital audio and image processing circuit for expanding the extracted specific compressed digital audio image data and converting it into a video signal.

On the transmission side in the digital audio image data distribution system according to the present invention, data corresponding to a plurality of programs is read into the information read controller from the single or plurality of information storage mediums having the compressed digital audio image data recorded thereon. The read data is superimposed on the video signal interval in the horizontal scanning period of the video signal as a digital signal as it is. At this time, the compressed digital audio image data corresponding to one program is superimposed thereon for each horizontal scanning period. Further, data corresponding to other programs are superimposed (interleaved) on their corresponding video intervals every horizontal scanning periods and the superimposed one is transmitted as a video signal for a normal analog channel.

On the reception side, an analog channel including a program designated by a user is first selected by the tuner. A clock for reproducing the digital signal from the signal interleaved during the horizontal scanning period is then extracted by the PLL circuit. The signal is returned back to digital data of a format before the signal is superimposed to a horizontal scanning period at a transmission side by sampling an analog signal of the horizontal scanning period with the extracted clock. Since the so-processed digital signal is one obtained by interleaving a plurality of programs every horizontal scanning periods, only compressed digital audio image data corresponding to the program thereof designated by the user is selected and taken out by the compressed digital audio image data selection circuit and sent to the digital audio and image processing circuit. The digital audio and image processing circuit performs separation between the compressed audio and image data and converts the same into an analog video signal after their expansion. This video signal is inputted to the television set where the program selected by the user is displayed thereon.

In the case of the analog video signal, only one program can be transmitted to one analog channel. In the present system referred to above, however, a plurality of programs can be sent to one analog channel. Further, since the audio and image signals have been digitally compressed and recorded on their corresponding information recording medium on the transmission side, an information read mechanism is not brought into contact with an optical disc if the information recording medium is of the optical disc. Even if the disc is repeatedly played back, the quality of an image is not declined. Further, even if the information recording medium is of a hard disc, a problem does not arise that the quality of an image is gradually degraded as an analog video tape or the like is repeatedly played back.

The above and other objects, features and advantages of the present invention will become apparent from the following description and the appended claims, taken in conjunction with the accompanying drawings in which a preferred embodiment of the present invention is shown by way of illustrative examples.

BRIEF DESCRIPTION OF THE DRAWINGS

The invention will hereinafter be described with reference to the accompanying drawings wherein.

DESCRIPTION OF THE PREFERRED EMBODIMENTS

One embodiment of the present invention will hereinafter be described with reference to the accompanying drawings.

Figure 1:
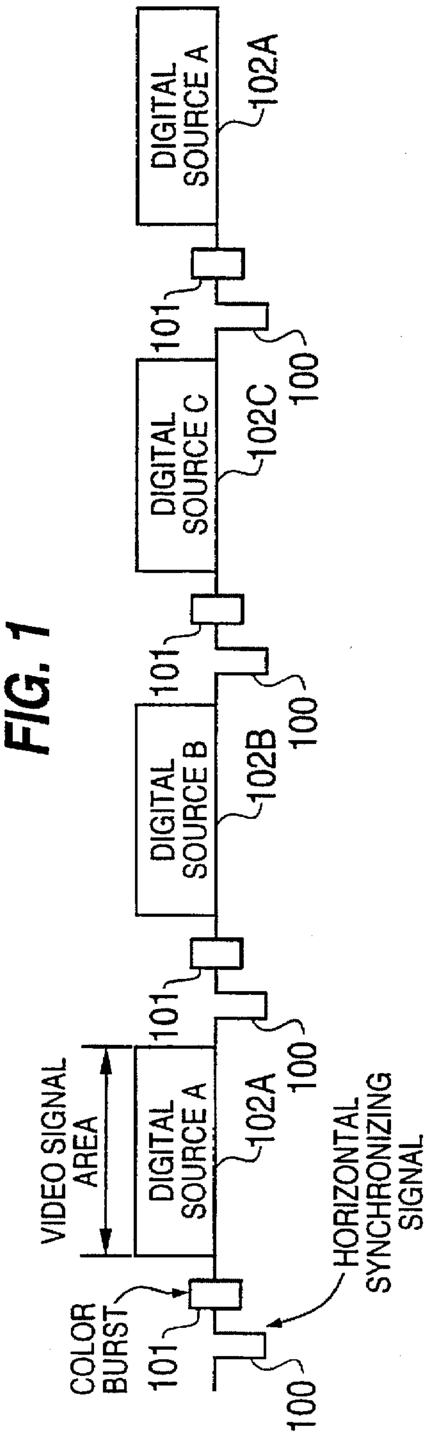
FIG. 1 is a block diagram for describing the concept of a data distribution format employed in a video data distribution system according to the present invention.

FIG. 1 shows a video signal format at the time that compressed digital voice or audio image data in a plurality of programs applied to the present invention are superimposed on video signals and the result of superimposition is transmitted. The present embodiment describes the case where three programs are time-division multiplexed and transmitted.

Reference numeral 100 indicates a horizontal synchronizing signal in a video signal. Reference numeral 101 indicates a color burst signal. Designated at numerals 102A, 102B and 102C are respectively digital source data which are parts of compressed digital audio image data in the respective programs. A normal video signal comprises the horizontal synchronizing signal 100, the color burst signal 101 and a video signal area during one horizontal scanning period (hereinafter abbreviated as "1H"). In the present embodiment, however, digital source data is superimposed on its corresponding video signal in place of an analog video signal in each video signal area.

If the compressed digital audio image data in the three programs are respectively regarded as digital sources A, B and C, then they are interleaved in order of the digital source A, digital source B and digital source C for each 1H as shown in FIG. 1 and superimposed on their corresponding video signals. Thus, if attention is given to the digital source A, for example, then the compressed digital audio image data in the same programs are superimposed on their corresponding video signals every 3H. It is in this case necessary to match a digital data transfer rate for each program with a data conversion rate at the time that the compressed digital audio image data are expanded and displayed.

By interleaving the compressed digital audio image data in the plurality of programs every H of the video signals and superimposing them thereon, the plurality of programs can be transmitted through a commonly-used video cable.

A description will now be made of the case where data corresponding to video CD (Compact Disc) standards are used as the compressed digital audio image data.

The video CD standards provide specifications for coding and compressing data and recording them in a CD-ROM (Compact Disc-Read Only Memory) based on MPEG1 (Moving Picture Expert Group 1) standards.

As data recording formats for the CD-ROM, there may be mentioned formats such as a mode 1, a mode2/form1, a mode2/form2. In the video CD standards, control information for a video CD is recorded on a disc in the format of the mode2/form1 and compressed audio image data is recorded on the disc in the format of the mode2/form2.

Figure 2:
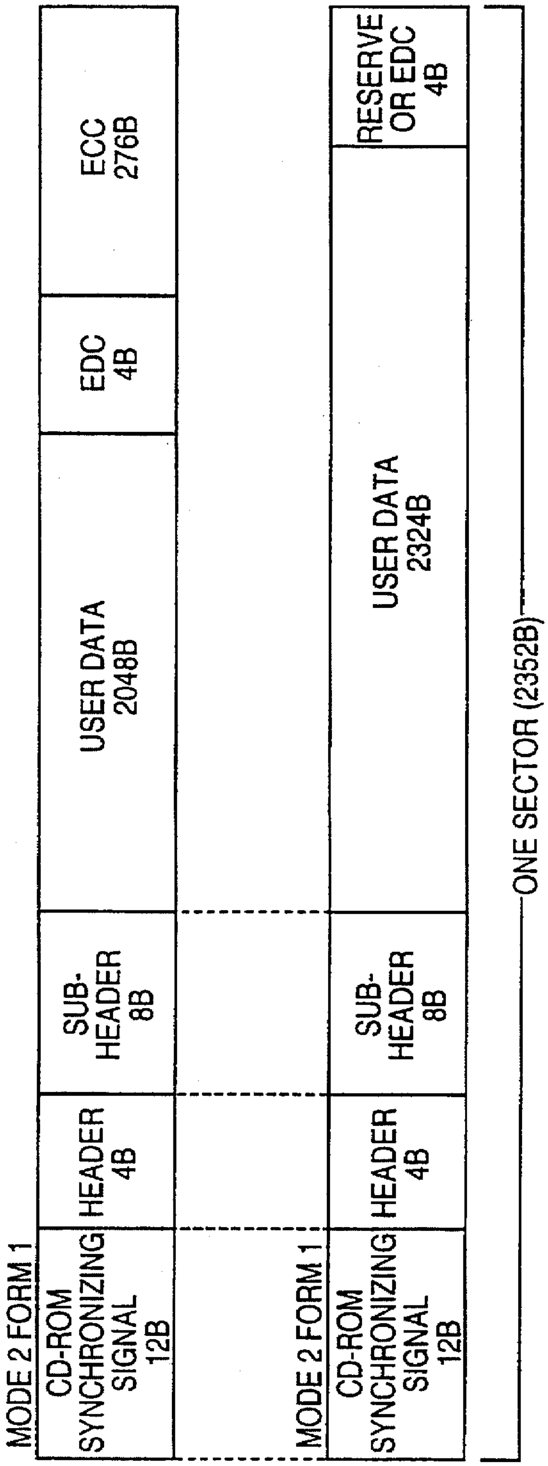
FIG. 2 is a view for describing a recording format of a CD-ROM.

As shown in FIG. 2, one sector is composed of 2352 bytes. If the normal reproduction speed is used, then data corresponding to 75 sectors are transmitted during one second. The details of the sector are as follows: 12-byte CD-ROM synchronizing signals, 4-byte headers and 8-byte subheaders are shared between the mode2/form1 and the mode2/form2. Except for the above shared components, the sector includes 2048-byte user data (control data for the video CD herein), 4-byte error detecting code (EDC (which is an abbreviation of Error Detecting Code)), and 276-byte error correcting code (ECC (Error Correcting Code)) under the format of the mode2/form1, whereas in the case of the mode2/form2, the sector includes 2324-byte user data (voice or audio image data compressed in MPEG1 herein) and a 4-byte reserve (or EDC) subsequently to the shared subheaders.

The transfer rate of these data is 1.5 Mbps. Data for each sector is sent to a MPEG1 decoder where it is expanded, whereby a continuous voice and motion picture are reproduced.

Now consider where the MPEG1 data of the CD format is superimposed on one NTSC signal of video signals, for example. Since the NTSC signal has a video signal band of 4.2 MHz, the data can be transmitted at a data transfer rate of about 6 MHz in the case of simple digital signals represented in binary form. Accordingly, four data obtained by dividing 6 MHz by 1.5 Mbps can be transmitted as the MPEG1 data of the CD format. However, if overheads such as a synchronizing signal, an error correcting code, etc. used when the digital signals are transmitted, are taken into consideration, then about three MPEG1 data can be superimposed on the corresponding NTSC signal. A description will hereafter be made of the case where the three MPEG1 data are superimposed on the NTSC signal.

It is desirable that when the digital data is superimposed on the NTSC signal as described above, a data transfer clock is set to an integral multiple of a frequency Fsc (3.579545 MHz) of a color burst signal in the NTSC signal so as to avoid the influence of beat interference on a video signal for other channel. In the present embodiment, a clock (7.15909 MHz: hereinafter described as 2 Fsc) set to twice the frequency Fsc will be used below.

Since 1H is represented as 63.5 μs and a video period thereof is represented as 52 μs in the NTSC signal standards, digital data superimposable within the video period becomes 372 bits (integral values) corresponding to a numerical value obtained by dividing 52 μs by a cycle or period of 2 Fsc. If 372 bits are expressed in byte form, then 46 bytes are obtained at maximum.

Further, a data transfer rate at which the three MPEG1 data is transferred, is given by the following equation:

$$2352(\text{Bytes})\times 75(\text{Sectors/s})\times 3(\text{Channel})=529200(\text{Bytes/s}) \quad (1)$$

On the other hand, if a frame frequency of the NTSC signal is regarded as 30 frames/s, then one frame is composed of 525H (all H can be used on condition that no vertical synchronizing signal is used). Therefore, the number of H transmittable during one second is given by the following equation:

$$30(\text{Frames})\times 525(\text{H})=15750(\text{H/s}) \quad (2)$$

Thus, the number of data transferred during 1H is given by the following equation:

$$529200(\text{Bytes/s})\div 15750(\text{H/s})=33.6(\text{Bytes}) \quad (3)$$

The integer should be set as the number of bytes in this case. Therefore, if the data are processed in units of 5H, then 168 bytes may be transferred during that time.

Since, however, the data cannot be uniformly distributed for each H in the form of bytes as described above, consideration should be given to the distribution of the data at each H. If 32 bytes are distributed to 1H of 5H and 34 bytes are distributed to the remaining 4H as one example, the following equation is established:

$$32+34\times 4=168 \text{ (data corresponding to 5H)} \quad (4)$$

This value is convenient as the distributed value. No problem occurs because these are respectively much smaller than the number of data or 46 bytes determined above, which are included in 1H. The remaining data of several tens of bytes can be used as overhead such as control or the like.

A format of time-division multiplexing of the three MPEG1 data under such a data distribution as described above will be described using FIG. 3.

Figure 3:
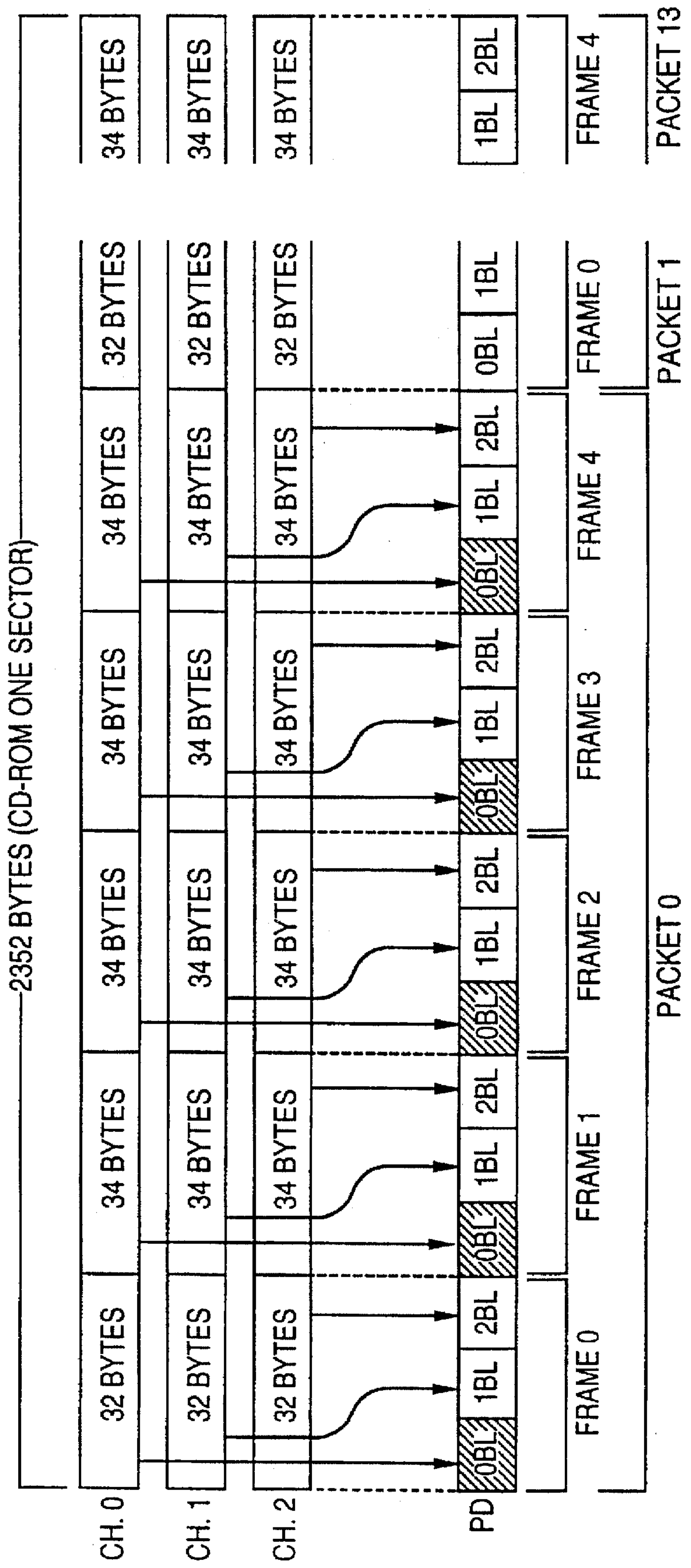
FIG. 3 is a view for describing time-division multiplexing effected on MPEG1 data of three CD-ROM formats, which is employed in the video data distribution system shown in FIG. 1.

Referring to FIG. 3, the three MPEG1 data of CD-ROM formats are respectively called channel data, which are represented as Ch. 0, Ch. 1 and Ch. 2 respectively. FIG. 3 describes data 2352 bytes corresponding to CD-ROM one sector per channel.

Each of the three CD-ROM type MPEG1 data is repeatedly divided into five blocks in total, which comprise one block having 32 bytes and four blocks each having 34 bytes. The 32-byte block placed in the Ch. 0 of the three channel data Ch. 0, Ch. 1 and Ch. 2, the 32-byte block placed in the Ch. 1 and the 32-byte block placed in the Ch. 2 are extracted and the extracted three blocks are arranged in order as a frame 0 in PD shown in FIG. 3. Accordingly, the number of data for the frame 0 is composed of 96 bytes corresponding to three times (corresponding to three blocks) the 32 bytes. Thereafter, the following 34-byte block placed in the Ch. 0, the following 34-byte block placed in the Ch. 1 and the following 34-byte block placed in the Ch. 2 are extracted and the extracted three blocks are placed in order as a frame 1 in PD shown in FIG. 3. Frames are successively composed of extracted blocks below in the same manner as described above. At this time, the number of data between the frame 1 and a frame 4 consists of 102 bytes corresponding to three times (corresponding to three blocks) the 34 bytes.

The frames 0 through 4 arranged in the above-described manner are integrated into one, which will hereinafter be Called "packet." This packet is one obtained by interleaving 168-byte data extending over the five blocks from the three MPEG1 data of the individual channels Ch. 0, Ch. 1 and Ch. 2 as described above. Since the packet is composed of 168 bytes as seen from one MPEG1 data, the data 2352 bytes corresponding to the CD-ROM one sector per channel consists of 14 packets from packets 0 to 13. The data can be easily isolated by the above data distribution.

Thus, the data isolated as indicated by the row of PD shown in FIG. 3 are superimposed on their corresponding portions of the video signal areas in the NTSC signal as digital signals every 32-byte or 34-byte blocks. One example of the configuration of data for a horizontal scanning period at this time will be described with reference to FIG. 4.

Figure 4:
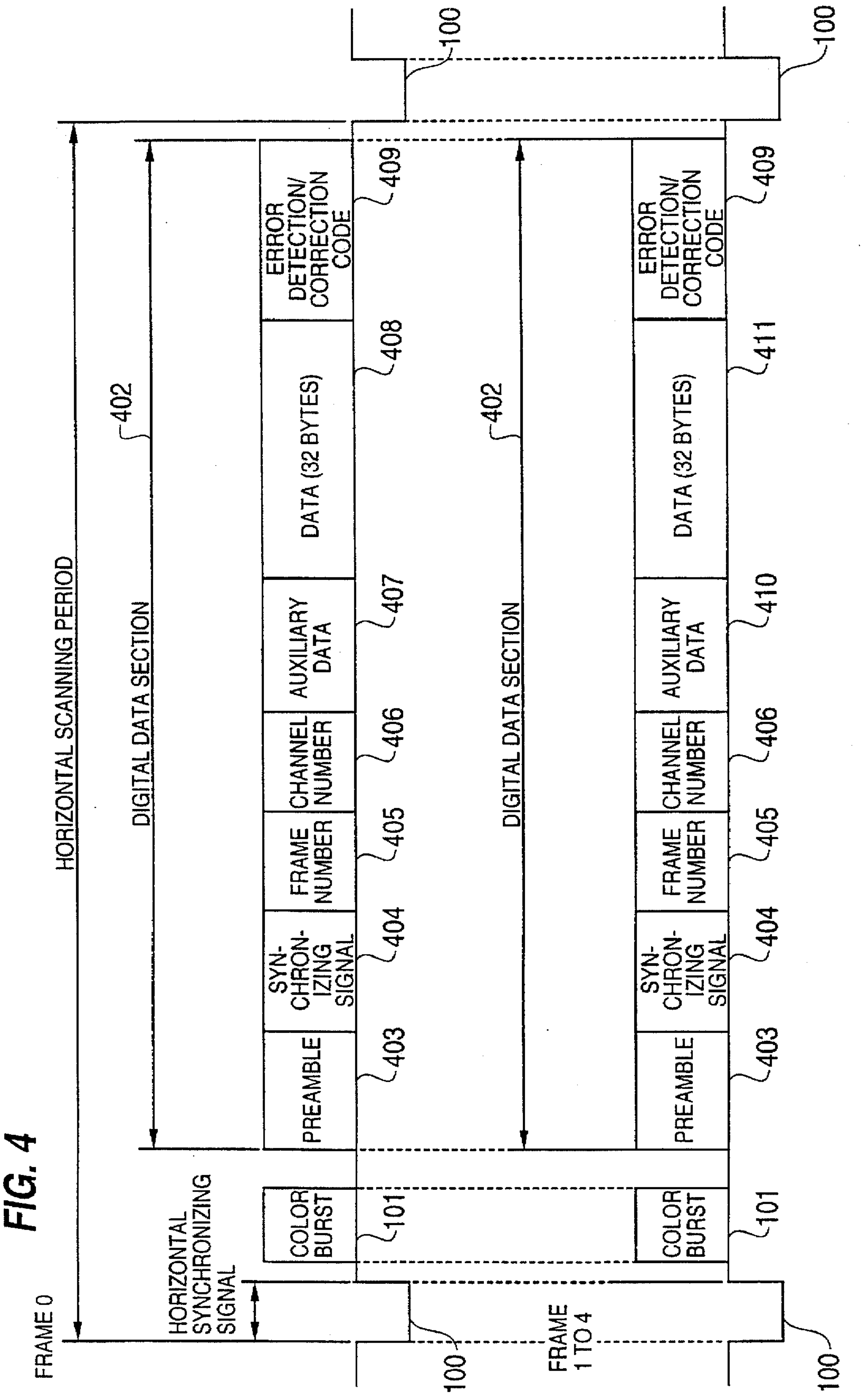
FIG. 4 is a view for describing formats of signals obtained by time-division multiplexing the MPEG1 data of three CD-ROM formats in the video data distribution system shown in FIG. 1 and thereafter superimposing the result of time-division multiplexing on video signals.

Referring to FIG. 4, the upper-stage configuration of data for 1H shows an example in which the 32-byte data corresponding to one block of the frame 0 is superimposed on the corresponding video signal area portion. As shown in FIG. 4, 1H is composed principally of a horizontal synchronizing signal 100, a color burst 101 and a digital data section 402. The digital data section 402 thereof comprises: a preamble 403 for regenerating or reproducing a clock synchronized with data; a synchronizing signal 404 for determining the beginning of bit-serial digital data superimposed on the NTSC signal and a data separation; a frame number 405 (if the frame number is 0, then MPEG1 data can be recognized as 32 bytes and it can be recognized as 34 bytes otherwise) for recognizing whether the subsequent MPEG1 data of the CD-ROM form corresponds to either 32 bytes or 34 bytes; a channel number 406 for recognizing any of the three MPEG1 data; auxiliary data 407 for transmitting control data; 32-byte CD-ROM type MPEG1 data 408; and an error detection/correction code 409 for detecting and correcting an error in data to be transferred.

If the digital data section is regarded as 46 bytes as described above, then the configuration of the data in the frame 0, for example, is as follows. The preamble 403, the synchronizing signal 404, the frame number 405, the channel number 406, the auxiliary data 407, the CD-ROM type MPEG1 data 408 and the error detection/correction code 409 are respectively distributed to 2 bytes, 2 bytes, one byte, one byte, 4 bytes, 32 bytes and 4 bytes. Since this data distribution varies according to the system, it is not always necessary to take the aforementioned data distribution.

When the frame number is 1 to 4, 1H composed of a horizontal synchronizing signal 100, a color burst 101 and a digital data section 402 is identical in configuration to that for the frame 0 as indicated by the lower-stage configuration of 1H shown in FIG. 4. Next, the digital data section 402 for the frame numbers 1 to 4 is identical in configuration from the preamble 403 to the channel number 406 to that for the frame number 0 as indicated by the horizontal scanning period at the lower stage shown in FIG. 4. Since the number of CD-ROM type MPEG1 data 411 subsequent to auxiliary data 410 is 34 bytes and is increased by 2 bytes as compared with the frame 0, the auxiliary data 410 for transmitting the subsequent control data is reduced by 2 bytes so as to match the number of data between the upper and lower stages 1H. Further, the 34-byte MPEG1 data 411 of CD-ROM format continues subsequently to the auxiliary data 410 as described above. Thereafter, an error detection/correction code 409 for detecting and correcting an error in data to be transferred in a manner similar to that for the frame 0 continues. The digital data section 402 for the frames 1 to 4 consists of 46 bytes in the same manner as the frame 0 and the matching in the number of data between the upper and lower stages 1H is made by the total number of the auxiliary data and the CD-ROM type MPEG1 data as described above.

Thus, each of the three CD-ROM type MPEG1 data is time-division multiplexed on the data transmission side and superimposed on the video signal area in the NTSC signal, followed by transmission of the superimposed data.

On the receiving side of the data transfer in the above-described manner, the digital data superimposed on the NTSC signal is extracted based on a regenerated or reproduced clock by using the preamble 403. Thereafter, the synchronizing signal 404 is provided for synchronization of the extracted data and thereby serial data represented in bit units are converted into data represented in byte units. Further, one of the three time-division multiplexed CD-ROM type MPEG1 data is selectively extracted based on the channel number 406. It is selected at this time, based on the frame number whether data to be read is either 32 bytes or 34 bytes. The read data is sent to the MPEG1 decoder where an audio or voice and a motion picture are expanded and reproduced.

Next, the operation of a digital audio image data transmitting and receiving system for performing an encode process such as the time-division multiplexing of the three MPEG1 data of CD-ROM formats, thereafter superimposing the data on the video signals, transmitting the superimposed data, extracting one of the MPEG1 data from the received signals transmitted in this way and decoding and reproducing the extracted one as described above, will be described with reference to FIGS. 5, 6 and 7.

Figure 5:
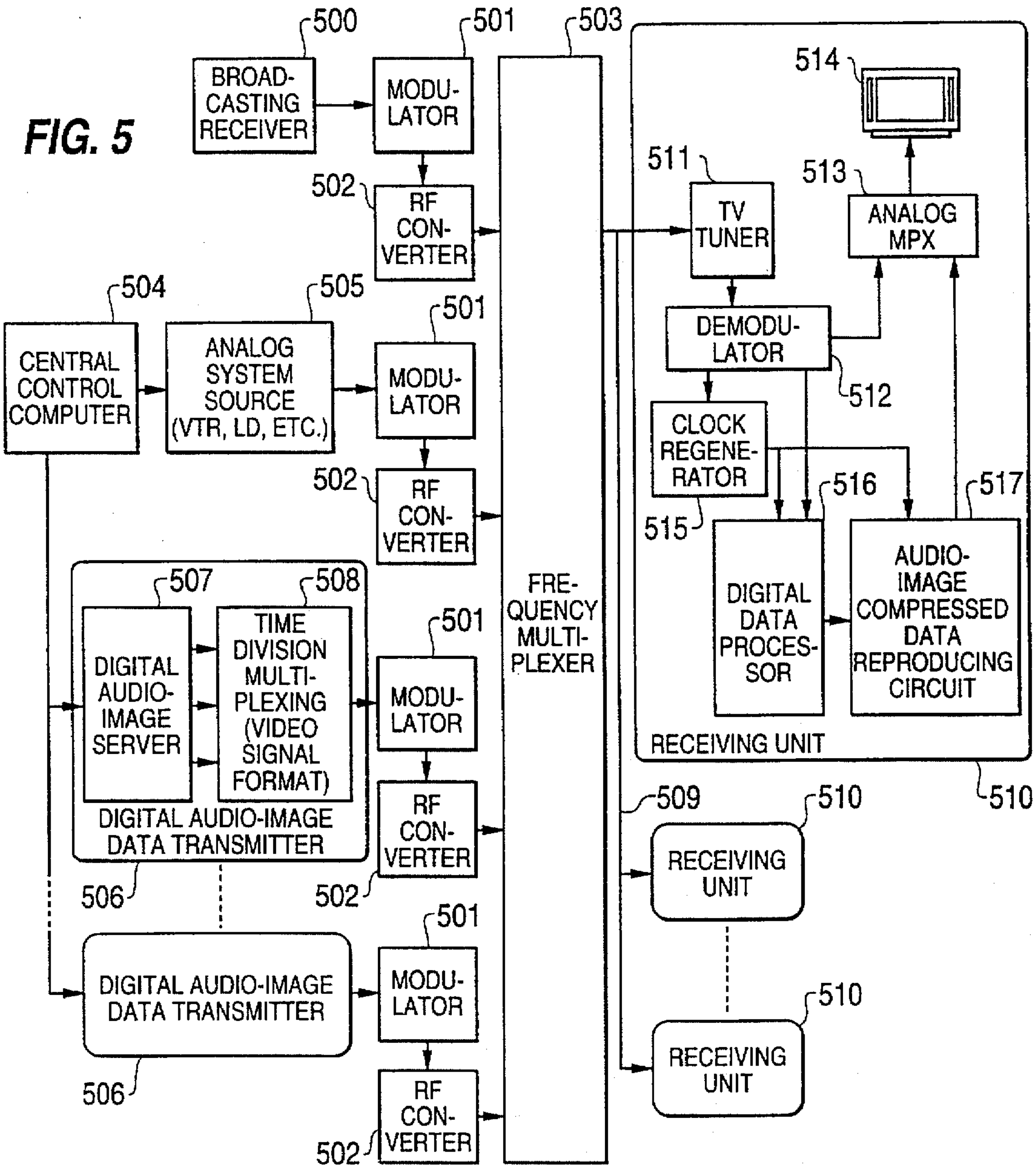
FIG. 5 is a system block diagram of the video data distribution system shown in FIG. 1.

FIG. 5 shows one example of a system for transmitting and receiving three MPEG1 data of CD-ROM formats. This type of system is a small-sized video distribution system suitable for use in a hotel, a hospital, etc. The present system will be described below as the small-sized video distribution system employed in the hotel.

Reference numeral 500 indicates a broadcasting receiver for receiving a conventional analog TV signal or the like therein. Reference numerals 501, 502, 503, 504, 505 and 506 respectively indicate a modulator, an RF converter, a frequency multiplexer, a central control computer for controlling the system for arranging or distributing video signals, an analog system source output unit such as a VTR (Video Tape Recorder) or an LD (Laser Disc) for outputting an analog system video signal other than that employed in a broadcasting system therefrom, and a digital audio image data transmitter for outputting a video signal of a digital system audio image source. Reference numerals 507 and 508 indicate a digital audio image server and a time division multiplexer for configurating the digital audio image data transmitter 506. Various video signals are transmitted or distributed to respective rooms provided in a hotel or the like by using these devices. Reference numeral 509 indicates a video signal transmission path for distributing the video signals to the respective rooms. Reference numerals 510 respectively indicate receiving units provided every rooms, for receiving and reproducing the transmitted or distributed video signals.

Further, reference numerals 511, 512, 513, 514, 515, 516 and 517 respectively indicate a TV tuner, a demodulator, an analog multiplexer, a TV monitor, a clock reproducer or regenerator, a digital data processor and a digital audio image compressed data reproducing circuit. These components constitute each receiving unit 510.

In the present embodiment, the commonly used TV signal is received by the broadcasting receiver 500 and thereafter modulated by the modulator 501. The modulated signal is converted into a predetermined channel by the RF converter 502, which is in turn multiplexed together with a signal for other channel by the frequency multiplexer 503.

The multiplexed TV signal is transmitted through the video signal transmission path 509 so as to be sent to each of the receiving units provided at every guest rooms in the hotel. Each of the users in the respective rooms selects a channel from the TV monitor 514 so as to receive an RF signal having a frequency for the channel selected by the TV tuner 511. The received RF signal is demodulated by the demodulator 512 so as to be converted into the original TV signal. The converted TV signal is sent to the analog multiplexer 513. When the user has selected a video channel in the broadcasting system at this time, then the analog multiplexer 513 is switched so as to cause the TV signal sent from the demodulator 512 to pass under the control of a channel selection circuit (not shown) of the TV monitor. The TV signal transmitted through the analog multiplexer 513 in this way enters into the TV monitor 514 from which an image or video and a voice of the TV signal selected by the user are outputted.

There may be cases where video such as the latest movies or the like which is not yet broadcasted on a TV or the like, is broadcasted as services peculiar to each user in the hotel. In this case, the central control computer 504 performs controls such as tape rewinding, a replay for disc reproduction, etc. on the VTR and LD used as devices for reproducing the broadcasting video. The video signal outputted from the analog system source output unit 505 provided with the VTR and the LD in the above-described manner is modulated by the modulator 501 in a manner similar to that for the TV signal. The modulated signal is converted into a predetermined channel associated with the VTR or LD by the RF converter 502. Further, the converted signal is multiplexed on frequency together with a signal for other channel by the frequency multiplexer 503.

When the user selects the predetermined channel associated with the VTR or LD at this time, the receiving unit 510 receives an RF signal having a frequency for a channel selected by the TV tuner 511. An image or video and a voice of the video signal selected by the user are outputted to the TV monitor 514 in a manner similar to that for the reproduction of the TV signal.

The conventional video distribution system used in the hotel or the like has been described above. A digital audio image data distribution system according to the present invention will now be described below.

Audio or voice image data compressed in digital form have been stored in the digital audio image server 507 of the digital audio image data transmitter 506. In the present embodiment, the MPEG1 described in the paragraph of the signal formats will be used in an image compression system. Three MPEG1 data of CD-ROM formats are simultaneously outputted from the digital audio image server 507 under the control of the central control computer 504 and are thereafter inputted to the time division multiplexer 508. After the input three MPEG1 data have been time-division multiplexed by the time division multiplexer 508 as shown in FIG. 3, each multiplexed data is superimposed on the video signal as shown in FIG. 4. Incidentally, details on the operation of the digital audio image data transmitter 506 will be described later.

The signal superimposed on the video signal in the above-described manner is modulated by the modulator 501 in a manner similar to that for the TV signal or the like. Thereafter, the modulated signal is converted into a predetermined channel by the RF converter, which is in turn multiplexed together with a signal for other channel by the frequency multiplexer 503.

When the user selects the predetermined channel corresponding to the digital audio image data at this time, the receiving unit 510 receives an RF signal having a frequency for a channel selected by the TV tuner 511. The received RF signal is demodulated by the demodulator 512, followed by conversion into the original video signal on which the digital data has been superimposed. The original video signal converted in the above-described manner is inputted to the clock regenerator 515 and the digital data processor 516. The clock regenerator 515 reproduces a clock signal whose frequency is N times (where N: integer), which is synchronized with the digital data superimposed on the video signal, and sends it to the digital data processor 516 and the audio image compressed data reproducing circuit 517. The digital data processor 516 extracts the digital signal superimposed on the video signal in response to the clock signal sent from the clock regenerator 515 and thereafter selectively extracts a digital signal associated with the channel selected by the user from the time-division multiplexed digital data. Next, the digital data processor 516 sends only digital data necessary for the expansion of audio image data to the audio image compressed data reproducing circuit 517. The audio image compressed data reproducing circuit 517 expands the input digital data and converts the same into an analog audio/image signal. Thereafter, the audio image compressed data reproducing circuit 517 converts the analog audio/image signal into an analog video signal and sends it to the analog multiplexer 513. If the user selects the digitized video channel at this time, then the analog multiplexer 513 is switched so as to cause the video signal sent from the audio image compressed data reproducing circuit 517 to pass therethrough. The video signal transmitted through the analog multiplexer 513 in this way is inputted to the TV monitor 514 from which the image and voice of the video signal for the digital source selected by the user are outputted. Incidentally, details on the operation of each receiving unit 510 will be described later.

Figure 6:
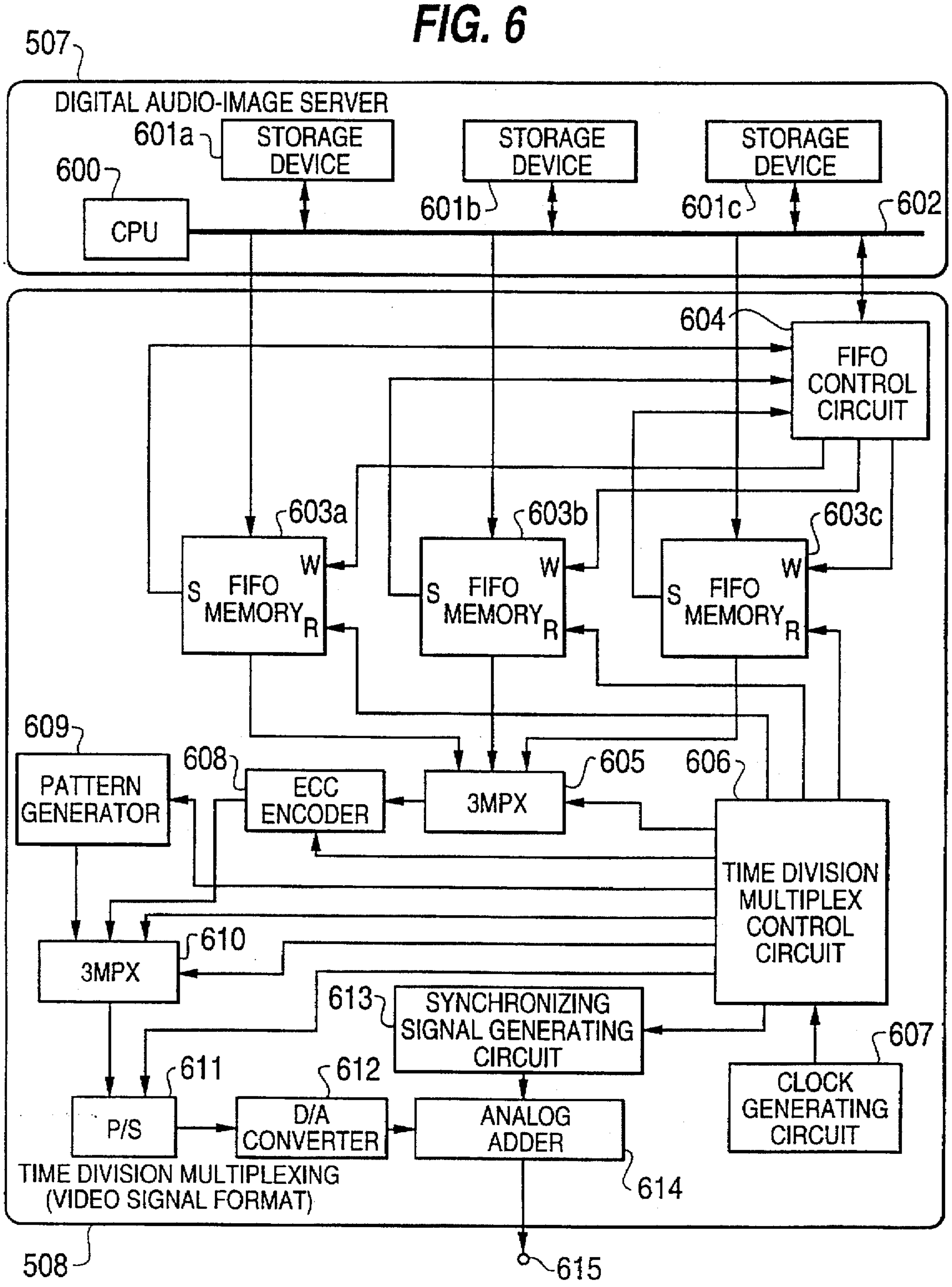
FIG. 6 is a block diagram for explaining the operation of a digital audio image data transmitter employed in the video data distribution system shown in FIG. 1.

Details on the operation of the digital audio image data transmitter 506 will now be described with reference to FIG. 6. In FIG. 6, the same elements of structure as those shown in FIG. 5 are identified by like reference numerals and their description will therefore be omitted.

In FIG. 6, reference numeral 600 indicates a CPU for controlling the output of data. Reference numerals **601*a*, 601*b* and 601*c* respectively indicate storage devices which store therein digital data compressed in accordance with the MPEG1. Reference numeral 602 indicates a data bus for transferring digital data and control data. These components constitute the digital audio image server 507**.

Further, reference numerals **603*a*, 603*b* and 603*c* respectively indicate FIFO memories for respectively temporarily storing the digital data sent from the storage devices 601*a*, 601*b* and 601*c* to time-division multiplex the digital data. Reference numeral 604 indicates an FIFO control circuit for controlling writing of the data into their corresponding FIFO memories 603*a*, 603*b* and 603*c*. Reference numeral 605 indicates a three-input multiplexer for time-division multiplexing the digital data outputted from the FIFO memories 603*a*, 603*b* and 603*c* by switching. Reference numeral 606 indicates a time division multiplex control circuit for performing time-division multiplexing control such as the reading of the data from the FIFO memories 603*a*, 603*b* and 603*c*, the selection of the three-input multiplexer 605, etc. Reference numeral 607 indicates a clock generating circuit for generating a fundamental or basic clock necessary when each digital data is transmitted. Reference numeral 608 indicates an ECC (Error Correcting Code) encoder for producing or generating parity data for correcting a data error produced during transmission. Reference numeral 609 indicates a pattern generator for generating a preamble and a digital synchronizing signal. Reference numeral 610 indicates a three-input multiplexer. Reference numeral 611 indicates a parallel data/serial data (P/S) converter. Reference numeral 612 indicates a digital/analog (D/A) converter. Reference numeral 613 indicates a video synchronizing signal generating circuit. Reference numeral 614 denotes an analog adder and reference numeral 615 indicates an output terminal for the analog adder 614, which is electrically connected to an input terminal (not shown in FIG. 5) of the modulator 501. The time division multiplexer 508** is composed of the components referred to above.

Referring to FIG. 6, the digital audio image server 507 serves so as to send the stored three MPEG1 data of CD-ROM formats to the time division multiplexer 508. The MPEG1 data have been stored in their corresponding storage devices 601*a*, 601*b* and 601*c*. Either a hard disc (HDD) well used as an external storage device for a computer or a CD-ROM player may be used as each of these storage devices 601*a*, 601*b* and 601*c*. The control for reproducing and outputting these data is performed by causing the CPU 600 to read status information indicative of, for example, how much the data sent from the FIFO memories 603*a*, 603*b* and 603*c* remain within the FIFO, through the FIFO control circuit 604 and using a criterion programmed into the CPU 600. At this time, the data bus 602 is used when the data outputted from the storage devices 601*a*, 601*b* and 601*c* are sent to their corresponding FIFO memories 603*a*, 603*b* and 603*c* and the CPU 600 performs the transfer of data between the CPU 600 and the FIFO control circuit 604.

A description will be made of the case where, for example, the storage device 601*a* is used as a CD-ROM player, a video CD is played through the CD-ROM player and digital data reproduced therefrom is written into a 128-Kbyte FIFO memory 603*a*.

Upon the initial operation, no data is stored in the FIFO memory 603*a*. Therefore, a status signal for an empty flag indicative of the absence of the data is transmitted from the FIFO memory 603*a* to the FIFO control circuit 604. The CPU 600 reads the status signal for the empty flag through the data bus 602. Thus, when the CPU 600 recognizes that the FIFO 603*a* has no data, the CPU 600 outputs a control signal to the FIFO memory 603*a* so as to instruct the storage device 601*a* to reproduce the data and transfer the data to the FIFO memory 603*a* through the data bus 602. Further, the CPU 600 also sends a control signal for writing data into the FIFO memory 603*a* to the FIFO control circuit 604. At this time, the data transfer is carried out in 2352 byte units each corresponding to the sector unit for the CD-ROM shown in FIG. 2.

As the data are successively stored in the FIFO memory 603*a* in this way, a status signal for a half full flag indicative of the fact that data exceeding 64 Kbytes corresponding to half the 128 Kbytes has been stored, is outputted from the FIFO memory 603*a* and is read into the CPU 600 through the FIFO control circuit 604. At this time, data corresponding to a 28th sector has been already written into the FIFO memory 603*a* (28 times the 2352 bytes become 65856 bytes). When the CPU 600 receives the status signal for the half full flag therein, the CPU 600 instructs the storage device 601*a* to stop the reproduction and transmission of the data after completion of the transmission of the data corresponding to the 28th sector. Further, the CPU 600 also instructs the FIFO control circuit 604 to stop the transmission of the control signal for writing the data into the FIFO memory 603*a* thereby stop writing. When the data is thereafter read from the FIFO memory 603*a* and the status signal for the half full flag is not outputted from the FIFO memory 603*a*, the CPU 600 resumes the writing of data from the storage device 601*a* to the FIFO memory 603*a*. Thus, the data represented in 64 Kbytes (28 sectors) or so are set so as to be stored in the FIFO memory 603*a* at all times. This reason is as follows: Namely, since a latency time for reading the following continuous data is produced in the CD-ROM player when the reading Of the data from the storage device 601*a* is stopped, the data are stored in the FIFO memory 603*a*. In the case of the CD-ROM player, no problem occurs if data corresponding to about 20 sectors are stored in the FIFO memory 603*a*. Incidentally, the operations between the storage device 601*b* and the FIFO memory 603*b* and between the storage device 601*c* and the FIFO memory 603*c* are performed in a manner similar to the operation between the storage device 601*a* and the FIFO memory 603*a*. Thus, the three sets referred to above are operated concurrently.

A description will now be made of the case where the three data are time-division multiplexed.

The whole control of the time division multiplexer 508 is performed by the time division multiplex control circuit 606. A master clock basic to the operation thereof is supplied from the clock generating circuit 607.

The fixed patterns of the preamble 403 and the synchronizing signal 404 shown in FIG. 4 are first read from the pattern generator 609 under the control of the time division multiplex control circuit 606 and then inputted via the three-input multiplexer 610 to the P/S data converter 611 where their parallel data are converted into serial data. At this time, the switching of the three-input multiplexer 610 and the control on the P/S data converter 611 are all performed by the time division multiplex control circuit 606. Thereafter, the frame number 405, the channel number 406 and the auxiliary data 407 or 410 are outputted under the control of the time division multiplex control circuit 606 and inputted via the three-input multiplexer 610 to the P/S data converter 611 where their parallel data are converted into serial data in a manner similar to that for the data from the pattern generator 609. Subsequently to this, CD-ROM type MPEG1 data is read as 32 bytes or 34 bytes from any of the FIFO memories 603*a*, 603*b* and 603*c* under the control of the time division multiplex control circuit 606. At this time, whether the MPEG1 data is read from any of the FIFO memories 603*a*, 603*b* and 603*c*, is managed by the time division multiplex control circuit 606. The MPEG1 data are read in order of the FIFO memories 603*a*, 603*b* and 603*c*, for example, for each horizontal scanning period in correspondence to the value of the channel number 406. This processing is performed under the control on the reading of data from any of the FIFO memories 603*a*, 603*b* and 603*c* by the time division multiplex control circuit 606 and the control on the switching of the three-input multiplexer 610 to the three-input multiplexer 605.

Further, the time division multiplex control circuit 606 also manages a distinction between 32 bytes and 34 bytes to be read. If the time-division multiplexed data are configured as shown in FIG. 3, then 32 bytes are read when the value of the frame number 405 is 0, whereas if the value thereof corresponds to any of 1 to 4, then 34 bytes are read. The data read in this way enters into the ECC encoder where a parity for error detection/correction is produced and added to the data. Thereafter, the so-processed data is inputted via the three-input multiplexer 610 to the P/S data converter 611 where its parallel data is converted into serial data in a manner similar to that for the data from the pattern generator 609. After the digital data section 402 has been constructed in this way, it is converted into an analog signal having a given level by the D/A converter 612. The so-produced analog signal is inputted to the analog adder 614 so as to be added to a horizontal synchronizing signal outputted from the video synchronizing signal generating circuit 613 in response to a control signal produced from the time division multiplex control circuit 606, with the result that the added signal becomes a video signal on which such data as shown in FIG. 4 has been superimposed. This signal is sent to the modulator 501 through the analog adder 614 and the output terminal 615 for the analog adder 614. The three MPEG1 data of CD-ROM formats are time-division multiplexed in this way and superimposed on the video signal.

Figure 7:
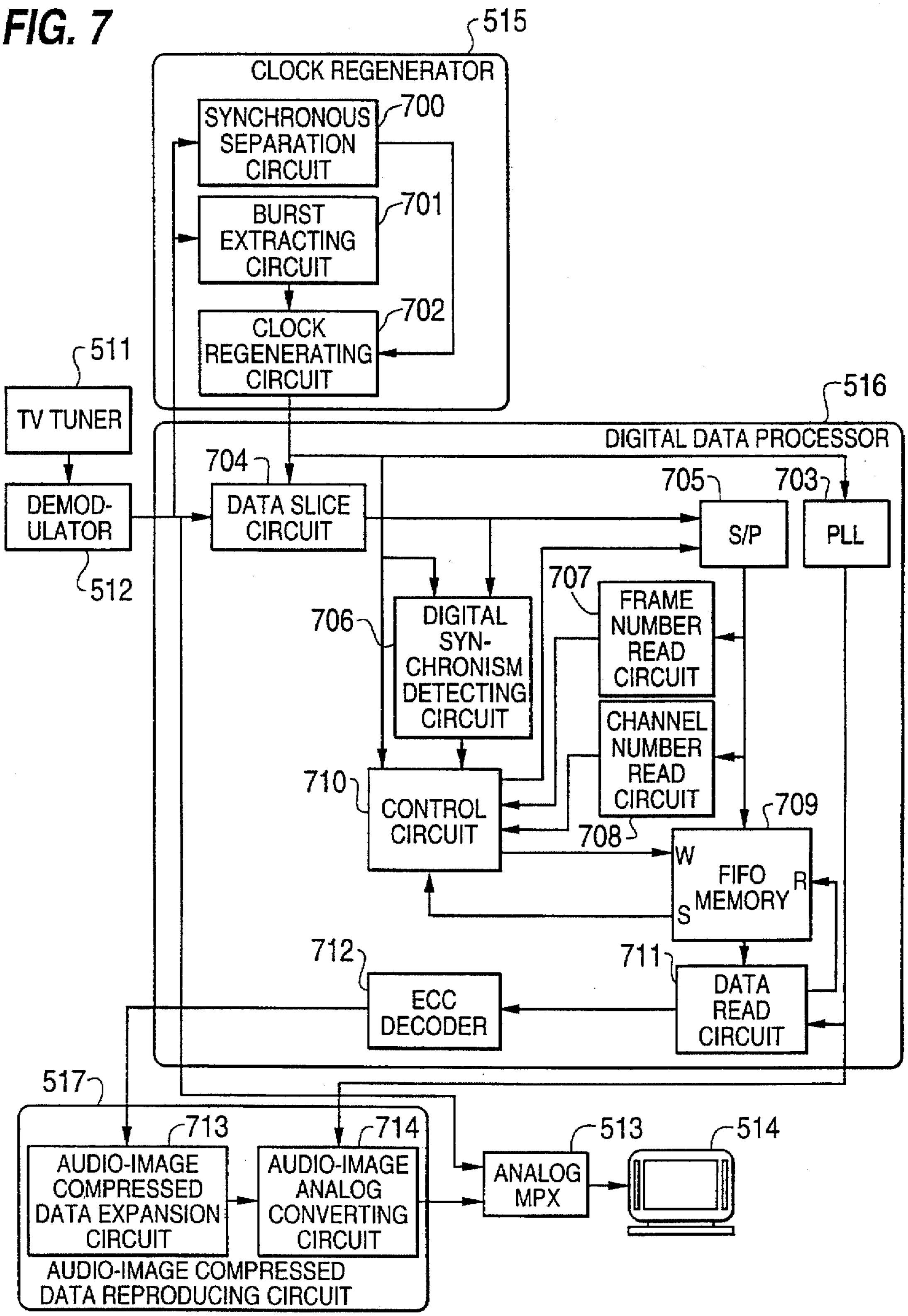
FIG. 7 is a block diagram for describing the operation of a receiving unit employed in the video data distribution system shown in FIG. 1.

Details on the operation of each receiving unit 510 will now be described using FIG. 7. In FIG. 7, the same elements of structure as those shown in FIG. 5 are identified by like reference numerals and their description will therefore be omitted.

In FIG. 7, reference numeral 700 indicates a video horizontal synchronizing signal separation circuit for separating a horizontal synchronizing signal from a video signal on which digital data have been superimposed. Reference numeral 701 indicates a color burst extracting circuit for separating a color burst signal from the video signal with the digital data superimposed thereon. Reference numeral 702 indicates a clock reproducing or regenerating circuit for regenerating a clock for extracting digital data from the video signal with the digital data superimposed thereon. Reference numeral 703 indicates a PLL circuit for producing a clock for reproducing audio image data in response to the clock outputted from the clock regenerating circuit 702. Reference numeral 704 indicates a data slice circuit for extracting digital data from the video signal with the digital data superimposed thereon. Reference numeral 705 indicates a serial/parallel (S/P) circuit for converting a digitized serial signal into parallel data. Reference numeral 706 indicates a digital synchronism detecting circuit for detecting a digital synchronizing signal 404 from the digitized serial signal. Reference numeral 707 indicates a frame number read circuit for reading a frame number 405 from the digital signal sent from the S/P circuit 705. Reference numeral 708 indicates a channel number read circuit for reading a channel number 406 from the delivered digital signal. Reference numeral 709 indicates an FIFO memory for temporarily storing therein data necessary for reading. Reference numeral 710 indicates a digital processing control circuit for performing the entire control of the digital data processor 516. Reference numeral 711 indicates a data read circuit for controlling the reading of data from the FIFO memory 709. Reference numeral 712 indicates an ECC decoder for detecting and correcting error data produced during data transmission. Reference numeral 713 indicates an audio image compressed data expansion circuit for expanding audio image data compressed based on the MPEG1. Reference numeral 714 indicates an audio image analog converting circuit for converting the expanded digital data into analog data.

Referring to FIG. 7, the TV tuner 511 selects the signal for the channel selected by the user from the frequency-multiplexed signal. Thereafter, the demodulator 512 demodulates the selected signal into a baseband video signal. Incidentally, the normal TV and video signals are transmitted directly to the analog multiplexer 513 from the demodulator 512 and thereafter inputted to the video monitor 514 from picture and sound signals are outputted.

Further, when the video signal on which the digital data time-division multiplexed by the digital audio image data transmitter 506 has been superimposed, is demodulated, the signal having the configuration or format shown in FIG. 4 is inputted to the video horizontal synchronizing signal separation circuit 700, the color burst extracting circuit 701 and the data slice circuit 704 from the demodulator 512. At this time, the analog multiplexer 513 is switched so as to cause data sent from the audio image compressed data reproducing circuit 517 to pass therethrough.

The video horizontal synchronizing signal separation circuit 700 separates a horizontal synchronizing signal 400 from a video signal and sends it to the clock regenerating circuit 702. The color burst extracting circuit 701 extracts a color burst signal 401 from the video signal and sends it to the clock regenerating circuit 702 in the same manner as described above. The clock regenerating circuit 702 regenerates each of clock signals each having a frequency of N (where N: integer) times the transfer rate of the delivered digital signal and whose phases are identical to each other, from the signals sent from the video horizontal synchronizing signal separation circuit 700 and the color burst extracting circuit 701. The clock is sent to each of the data slice circuit 704, the PLL circuit 703, the digital synchronism detecting circuit 706 and the digital processing control circuit 710. The data slice circuit 704 converts only a digital data section superimposed on a video signal area in the video signal into serial digital data in response to the clock signal produced from the clock regenerating circuit 702. The serial digital data is inputted to the digital synchronism detecting circuit 706 and the S/P circuit 705. When the digital synchronizing signal 404 is detected by the digital synchronism detecting circuit 706, the S/P circuit 705 converts the serial signal into parallel data in response to the detected timing. The so-parallel converted digital data is inputted to each of the frame number read circuit 707, the channel number read circuit 708 and the FIFO memory 709. The frame number read circuit 707 reads a frame number 405 from a parallel digital series and sends it to the digital processing control circuit 710. This is used to judge or determine whether the number of audio image data included in the parallel-converted data is 32 bytes or 34 bytes. Namely, if the read frame number 405 is 0, then the digital processing control circuit 710 performs control for writing MPEG1 data into its corresponding 32-byte FIFO memory 709. If the read frame number 405 corresponds to any of 1 to 4, then the digital processing control circuit 710 performs control for writing MPEG1 data into its corresponding 34-byte FIFO memory 709.

Further, the channel number read circuit 708 reads a channel number 406 from the parallel digital series and sends it to the digital processing control circuit 710. This is used to extract only MPEG1 data selected by the user from three MPEG1 data. Namely, when the read channel number 406 matches with one designated by the user, data is written into the FIFO memory 709. If they do not match with each other, then the data is not written into the FIFO memory 709.

The digital processing control circuit 710 performs control for writing data into the FIFO memory 709 based on the frame number 405 and the channel number 406 read from the parallel digital data as described above.

Further, the data written into the FIFO memory 709 is read under the control of the data read circuit 711 in unison with the reading clock produced from the PLL circuit 703. The thus data read from the FIFO memory 709 is inputted to the ECC decoder 712 where a data error produced during data transmission is detected and corrected and an ECC parity is deleted from a data series. Data outputted from the ECC decoder 712 enters into the audio image compressed data expansion circuit 713 where audio and image data are respectively expanded, after which the expanded data are converted into an analog video signal by the audio image analog converting circuit 714. This video signal is inputted via the analog multiplexer 513 to the video monitor from which image and sound data are outputted.

Figure 8:
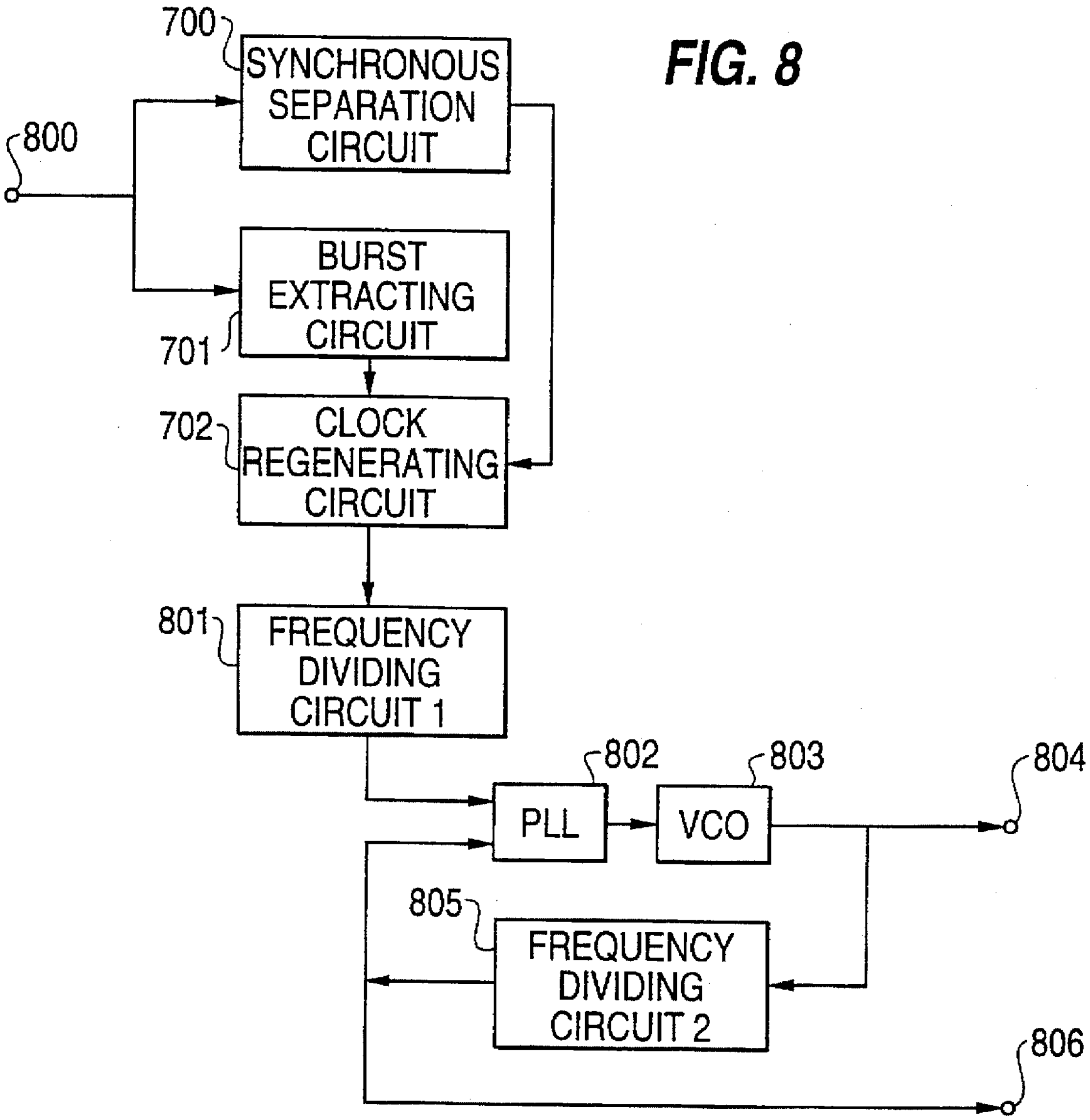
FIG. 8 is a block diagram for explaining a clock relationship between receiving units employed in the video data distribution system shown in FIG. 1.
Figure 9:
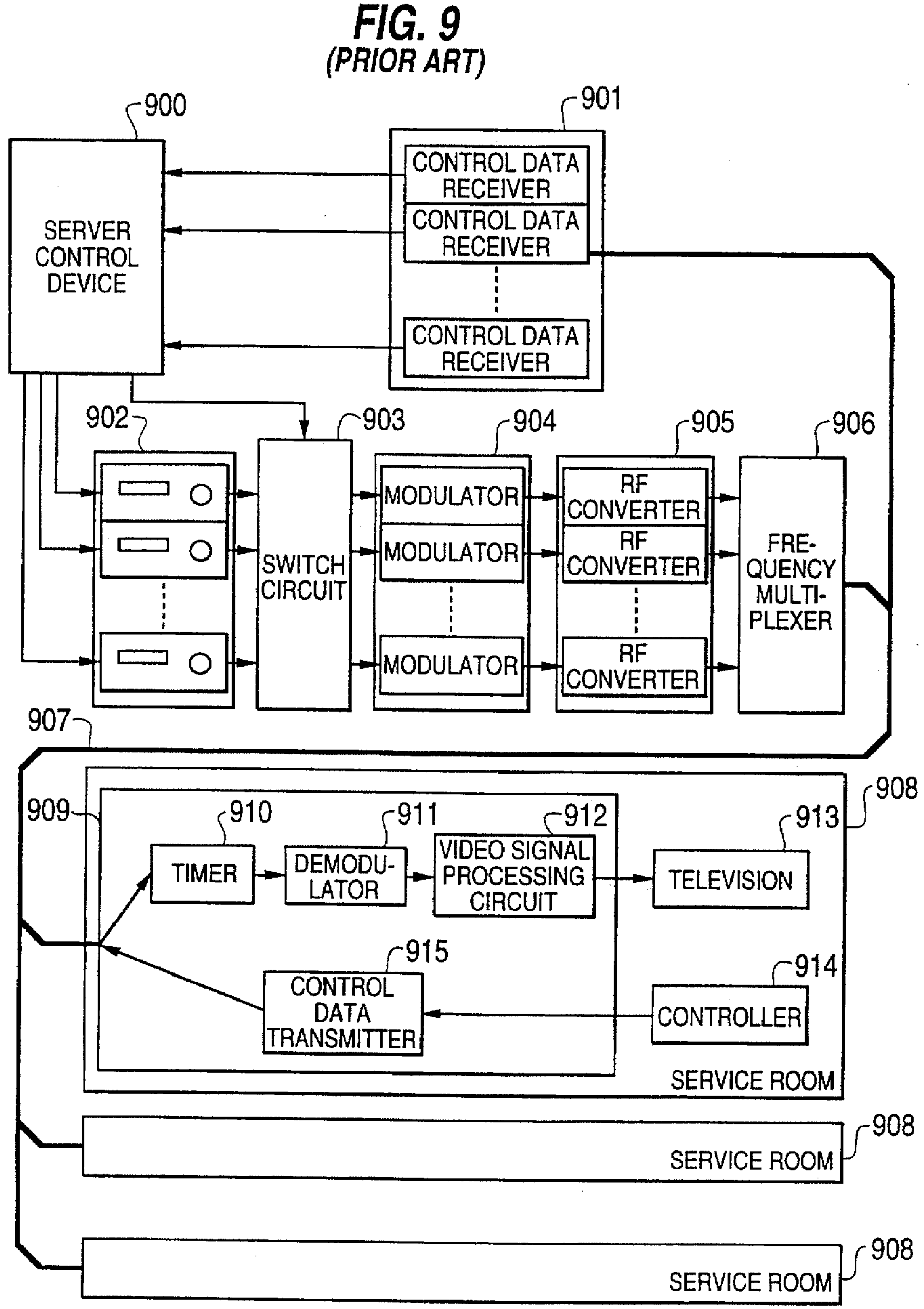
FIG. 9 (PRIOR ART)
FIG. 9 is a block diagram for describing a conventional analog video signal distribution system.
Figure 10:
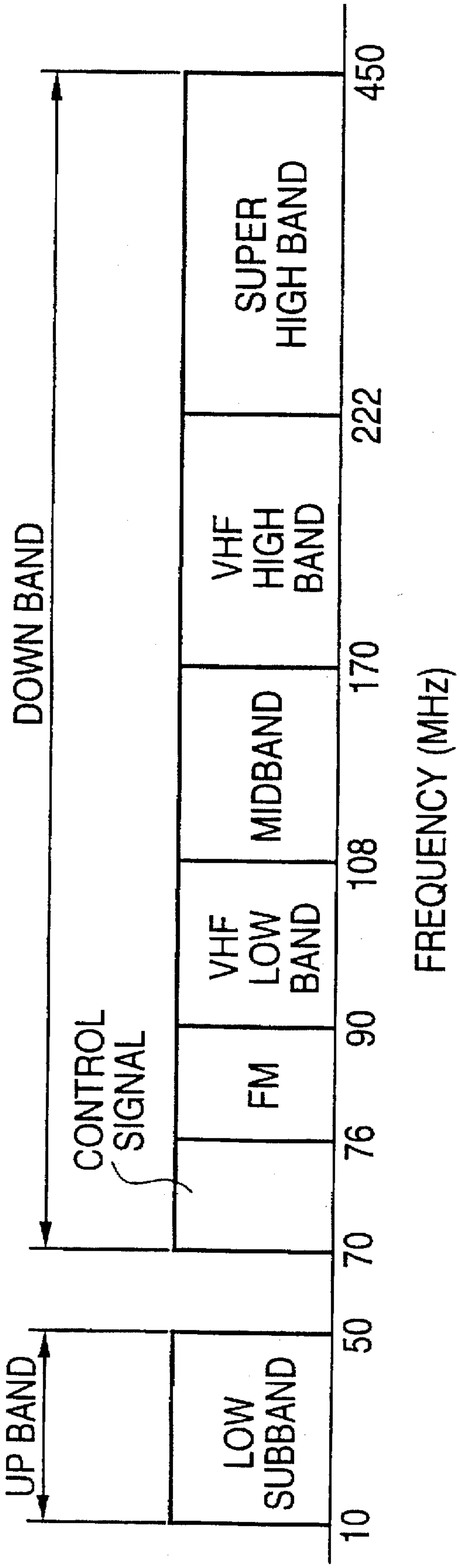
FIG. 10 (PRIOR ART)
FIG. 10 is a view for describing a frequency band available in the conventional analog video signal distribution system shown in FIG. 9.

A clock regenerating or reproducing system employed in each receiving unit 510 will further be described with reference to FIG. 8. In FIG. 8, the same element of structure as those shown in FIG. 7 are identified by like reference numerals and their description will therefore be omitted.

In FIG. 8, reference numerals 800, 801, 802, 803, 804, 805 and 806 respectively indicate a video signal input terminal, a frequency dividing circuit 1, a phase comparator, a voltage-controlled oscillator, a control clock output terminal, a frequency dividing circuit 2 and an audio signal sampling clock output terminal.

A video signal on which time-division multiplexed MPEG1 digital data has been superimposed, is inputted to a reference signal input terminal 800 from the demodulator 512 (not shown in FIG. 8) and each of clock signals each having a frequency of N times the digital data superimposed on the video signal and whose phases are synchronized with each other, is reproduced from the clock regenerating circuit 702. In the aforementioned description of system, a frame frequency of an NTSC signal that is a kind of video signal, has been calculated as 30 Hz to provide easy understanding. However, the frame frequency is originally 29.97 Hz and is hence reduced by 0.1%. Namely, the transfer rate of the digital data superimposed on the video signal is also reduced by 0.1%. When, for example, a frequency of 4 times the frequency of the clock for transfer of the digital data is reproduced at this time, a clock signal whose frequency is 14.31818 MHz (4 Fsc), is outputted from the clock regenerating circuit 702.

Thus, since the transfer rate of the delivered digital data is reduced by 0.1%, data becomes insufficient unless the data is expanded in a state in which the rate at which the digital data is expanded, has been also reduced by 0.1%, thereby leading to a system failure. It is therefore necessary to make the matching between the transfer rate of the delivered or distributed data and the expansion rate of data and synchronize the phases of clocks that become their sources.

Now consider a clock signal having 16.9344 MHz (Fcd) well employed in a CD-ROM player as a clock on the data expansion side, for example. In this case, a clock signal having about 16.9174 MHz (Fcd') obtained by reducing 16.9344 MHz by 0.1% is required in practice. Thus, in order to generate the clock signal of Fcd', a comparison in phase between the clock signal of Fcd' and the clock signal of 4 Fsc is made under the frequency corresponding to the greatest common divisor by the voltage-controlled oscillator 803. Thereafter, the result of comparison may be fed back to the voltage-controlled oscillator 803. In the present embodiment, the frequency of the greatest common divisor is about 44.056 kHz. Further, the clock of 4 Fsc may be frequency-divided by 1/325 and the clock of Fcd' may be frequency-divided by 1/384. In FIG. 8, the 4 Fsc clock signal outputted from the clock regenerating circuit 702 is frequency-divided by 1/325 by the frequency dividing circuit 1 801, followed by input to the phase comparator 802. Further, the Fcd' clock signal produced from the voltage-controlled oscillator 803 is also frequency-divided by 1/384 by the frequency dividing circuit 2 805, followed by input to the phase comparator 802 in the same manner as described above. A comparison in phase between the frequency-divided signals is made by the phase comparator 802 and the result of comparison is fed back to the voltage-controlled oscillator 803 so as to be reflected on the clock of Fcd'. The phase-compared clock signal of Fcd' is outputted from the control clock output terminal 804 as a clock on the expansion side of the MPEG1 data. Further, a clock signal of about 44.056 kHz obtained by frequency-dividing Fcd' by 1/384 is outputted from the audio signal sampling clock output terminal 806.

The clock signal of 44.056 kHz is of a signal obtained by reducing 44.1 kHz by 0.1%. A clock signal of 44.1 kHz is originally used upon digital-to-analog conversion of an audio signal in a manner similar to that for the audio CD (Compact Disc). Though the audio signal is lowered by 0.1% in tune, this presents little problem because it cannot be recognized by the human ears. No problem occurs in the video signal either in the same manner as described above.

According to a method of and a system for delivering or distributing digital audio image data, of the present invention, digital audio image data corresponding to a plurality of channels (three channels in the aforementioned embodiment) can be distributed or delivered to an analog one channel band without changing the already-existing analog signal distribution cable.

Further, the audio image data can be stored in digital form on the data delivery or distribution side. Therefore, since a video CD disc is read by a non-contact laser beam if a storage device for storing the audio image data therein is of, for example, a CD-ROM player, the quality of an image or the like is not declined even if an access to the CD disc is made again and again. Further, since the disc is used, the access to the CD disc can be made faster and anybody can easily replace the disc with another, thereby making it possible to provide easy replacement of a video program to be distributed for broadcast with another.

Furthermore, since data is read under the non-contact operation similarly even when a hard disc is used, the quality of an image or the like is not degraded even if an access to the hard disc is repeated.

Having now fully described the invention, it will be apparent to those skilled in the art that many changes and modifications can be made without departing from the spirit or scope of the invention as set forth herein.

What is claimed is:

1. A method of distributing digital audio image data, said method being suitable for use in a video distribution system having a signal distribution unit for distributing video signals to a plurality of channels respectively, at least one receiving unit for receiving a distributed video signal therein and reproducing an image signal and an audio signal and wherein an analog transmission path is used between said distribution unit and said receiving unit, said method comprising the following steps:

respectively time-dividing digitally-compressed audio image data for the plurality of channels; and interleaving the time-divided audio image data in a video signal area of each video signal in channel units for each horizontal scanning period, superimposing them on the video signal area and transmitting the superimposed data.

2. A method of distributing digital audio image data according to claim 1, wherein the digitally-compressed audio image data are represented in signal formats of video CD standards.

3. A method of distributing digital audio image data according to claim 1, wherein the transfer rate of the digitally-compressed audio image data superimposed on the video signal area of each video signal is an integral multiple of a color burst signal in the video signal.

4. A method of distributing digital audio image data according to claim 1, wherein the audio image data are multiplexed over a vertical synchronizing signal in said each video signal.

5. A method of distributing digital audio image data according to any one of claims 1 through 4, wherein the number of the digitally-compressed audio image data per channel data, which are superimposed on five horizontal scanning periods and represented in the video CD signal formats, is 168 bytes.

6. In a video distribution system having a signal distribution unit for distributing video signals to a plurality of channels respectively, at least one receiving unit for receiving a distributed video signal therein and reproducing an image signal and an audio signal and wherein an analog transmission path is used between said distribution unit and said receiving unit, an improved digital audio image data distribution system comprising:

digital data reproducing means for outputting digitally-compressed audio image data corresponding to the plurality of channels to which the video signal are distributed by said distribution unit;

storing means for temporarily storing the data outputted from said digital data reproducing means to time-divide the data; and adding means for reading digital data from said storing means in synchronism with a color burst signal in said each video signal and superimposing the read digital data on a video signal area in the video signal;

whereby the digital data are distributed in video-signal formats.

7. A digital audio image data distribution system according to claim 6, wherein said digital data reproducing means is a plurality of CD-ROM players.

8. A digital audio image data distribution system according to claim 6, wherein said digital data reproducing means is a hard disc device which stores a plurality of said digitally-compressed audio image data therein and reproduces said plurality of digitally-compressed audio image data on a time-sharing basis.

9. In a video distribution system having a signal distribution unit for distributing video signals to a plurality of channels respectively, a receiving unit for receiving a distributed video signal therein and reproducing an image signal and an audio signal and wherein an analog transmission path is used between said distribution unit and said receiving unit, an improved digital audio image data distribution system comprising:

video synchronizing signal extracting means for extracting a horizontal synchronizing signal and a color burst signal from the received video signal;

clock regenerating means for reproducing a first clock synchronized with the phase of the color burst signal extracted by said video synchronizing signal extracting means;

digital data extracting means for extracting audio image compressed digital data superimposed on a video signal area of the received video signal on a basis of said first clock;

PLL means for reproducing a second clock from a signal outputted from said clock regenerating means; and storing means for converting the audio image compressed digital data supplied from said digital data extracting means from a first clock rate to a second clock rate;

wherein the audio image compressed digital data read out from said storing means at said second clock rate digitally extended to reproduce the audio and image signals before digital compression.

10. A digital audio image data distribution system according to claim 9, wherein the audio image compressed digital data is expanded at the second clock rate.

11. A method of distributing digital audio image data, said method being suitable for use in a video distribution system having a signal distribution unit for distributing video signals to a plurality of channels respectively according to an NTSC scanning period, at least one receiving unit for receiving a distributed video signal therein and reproducing an image signal and an audio signal and wherein an analog transmission path is used between said distribution unit and said receiving unit, said method comprising the steps of:

respectively time-dividing digitally-compressed MPEG audio/image data for the plurality of channels; and interleaving the time-divided audio/image data in a video signal area of each video signal in channel units for each NTSC horizontal scanning period, superimposing them on the video signal area and transmitting the superimposed data on the analog transmission path.

* * * * *